(No Model.)

A. M. HOWARD.
ADJUSTABLE SHAFT.

No. 514,004.      Patented Feb. 6, 1894.

Witnesses
Jas. J. Maloney.
M. E. Hill.

Inventor.
Anson M. Howard
by Jno. P. Lunmoe Att'y.

THE NATIONAL LITHOGRAPHING COMPANY,
WASHINGTON, D. C.

UNITED STATES PATENT OFFICE.

ANSON MERRICK HOWARD, OF NEW HAVEN, CONNECTICUT, ASSIGNOR TO THE RHOADS SASH BALANCE COMPANY, OF SAN FRANCISCO, CALIFORNIA.

ADJUSTABLE SHAFT.

SPECIFICATION forming part of Letters Patent No. 514,004, dated February 6, 1894.

Application filed May 31, 1893. Serial No. 476,039. (No model.)

*To all whom it may concern:*

Be it known that I, ANSON MERRICK HOWARD, of New Haven, county of New Haven, State of Connecticut, have invented an Improvement in Adjustable Shafts, of which the following description, in connection with the accompanying drawings, is a specification, like letters on the drawings representing like parts.

The object of this invention is to produce a shaft that can be adjusted or varied in length and is substantially rigid when adjusted. The invention is embodied in a shaft composed of two or more parts one mortised, grooved, or recessed to receive a corresponding portion of the other, which can be inserted to a greater or less extent to thus vary the effective length of the two engaged parts. The recessed part is provided with an external screw-thread, and the recess, or a portion thereof, constitutes a groove in the periphery of the threaded part, and the other member has a corresponding rib which enters the said groove and is provided with portions of screw threads which will coincide and become practically continuous with the thread on the other portion of the shaft, which is provided with a nut or internally threaded sleeve that can be run on to the coinciding threads of the two parts of the shaft and will thus lock them firmly against relative longitudinal movement. Preferably two such nuts are employed so that they can be jammed together to prevent accidental displacement and hold the two parts of the shaft more firmly.

Figure 1:
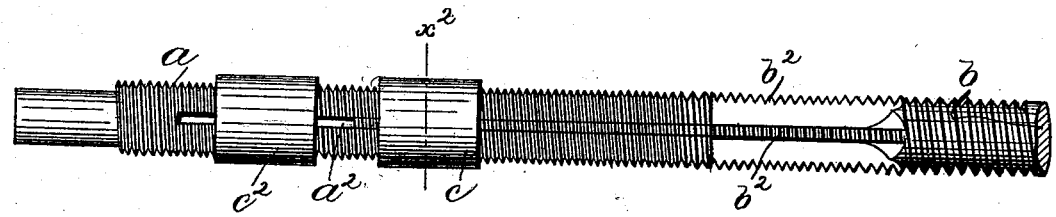
Figure 2:
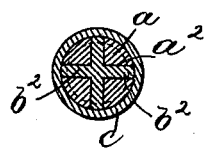

Figure 1 is a side elevation of an adjustable shaft embodying this invention; Fig. 2 a transverse section thereof on line $x^2$, Fig. 1, and Figs. 3 and 4 similar views showing a modified construction thereof.

The shaft is composed of two parts $a$, $b$, which are to be connected in such manner that their engaging portions can be overlapped a greater or less extent to thereby vary the effective length of the two connected parts, and when thus overlapped are to be securely held together so as to constitute a substantially rigid shaft capable of transmitting torsional or other desired movement.

In the construction shown in Fig. 1, the part $a$ is provided with two longitudinal slits $a^2$ intersecting one another at right angles and cut wholly through the shaft as shown, while the other member $b$ has a portion $b^2$ of the same sectional shape as the recess $a^2$ of the part $a$ thus forming a cross shaped tenon which enters the corresponding cross shaped recess $a^2$ in the part $a$. The said tenon can be inserted to a greater or less extent in the said recess according as the length of the entire shaft $a$, $b$, is to be less or greater, and in order to rigidly lock or secure the parts against relative movement after they are once properly adjusted, or overlapped, the amount desired to give the required length of the shaft, the said portion is provided with an external screw thread as shown, and the projections $b^2$ of the part $b$ have corresponding screw thread portions which thus coincide with and complete the thread of the portion $a$ in that part which is entered by the said tenon $b^2$ of the part $b$. A nut or internally threaded sleeve $c$ and preferably a second nut $c^2$ to co-operate therewith as a check nut are fitted upon the thread of the shaft $a$ and by running the said nuts off from the recessed portion of the shaft $a$, the tenon portion of the shaft $b$ can be inserted to any desired distance, and stopped with its thread portions in coincidence with those on the part $a$ after which the nut $c$ can be turned on to the overlapping parts of the shaft and by its engagement with the threaded portions of each will prevent further longitudinal movement of one with relation to the other, and by turning the two nuts $c$, $c^2$, firmly against one another the two parts of the shaft can be locked very rigidly together so as to operate substantially as a solid shaft for any purpose that may be desired.

Figure 3:
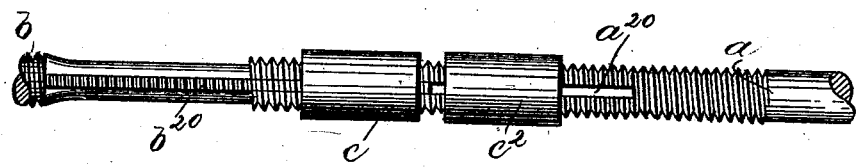
Figure 4:
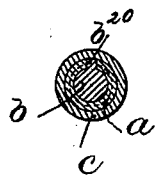

In the construction shown in Figs. 3 and 4, the recessed part $a$ is for the most part cylindrical making a portion of the part $a$ tubular, but there is a slot $a^{20}$, cut through to the periphery of the recessed part of the shaft $a$ which is externally threaded, and the other portion $b$ of the shaft besides having a cylindrical tenon to fit the bore of the shaft $a$ also has a rib $b^{20}$, which fills the slot $a^{20}$, and is provided with thread portions to coincide with and complete the thread on the other part of the shaft, so that the two parts may be adjusted and then locked against further relative movement by nuts $c$, $c^2$, as described in connection with the construction shown in Figs. 1 and 2.

In the construction shown in Fig. 3, the adjustment of the shaft must be in steps each of which is equal to the distance between two consecutive turns of the screw-thread; but with the construction shown in Fig. 1, i. e., when the slot or slots are cut diametrically through the shaft, or the latter has more than one longitudinal groove in its periphery, a more minute adjustment may be made if necessary by wholly withdrawing the portion $b$ from the portion $a$ and turning the former quarter around in one or the other direction or half around before re-inserting it, by which plan the adjustment of length of the shaft may be made to within one-fourth of the distance between two turns of the thread, so that if for example, the thread is one of twenty-five turns to the inch the length of the shaft may be adjusted to within one-hundredth of an inch.

I claim—

1. An adjustable shaft made up of two parts one having a longitudinal recess and the other a corresponding tenon to be inserted any desired distance in said recess, the recessed portion being externally threaded and having a longitudinal groove cut through its threaded periphery, and the tenon portion fitting the said groove and having threaded portions coinciding with the thread on the recessed part, and an internally threaded nut or sleeve cooperating with said threaded portions, substantially as described.

2. The shaft composed of two parts one screw-threaded and provided with longitudinal slots cut diametrically through the same, and the other having a corresponding tongue or tenon fitting said slots and having thread portions coinciding with those of the slotted part, combined with a threaded sleeve or nut cooperating with the said threaded portions, substantially as described.

In testimony whereof I have signed my name to this specification in the presence of two subscribing witnesses.

ANSON MERRICK HOWARD.

Witnesses:
ALBERT J. KENYON,
PHILIP POND, 2nd.